United States Patent
Tanabiki et al.

(10) Patent No.: US 6,834,799 B2
(45) Date of Patent: Dec. 28, 2004

(54) IC CARD WITH CAPABILITY OF HAVING PLURALITY OF CARD MANAGERS INSTALLED

(75) Inventors: Masamoto Tanabiki, Tokyo (JP); Kazuo Sakushima, Kawasaki (JP); Kazunori Inoue, Tokyo (JP); Takafumi Kikuchi, Tokyo (JP)

(73) Assignee: Matsushita Electric Industrial Co. Ltd., Osaka (JP)

(*) Notice: Subject to any disclaimer, the term of this patent is extended or adjusted under 35 U.S.C. 154(b) by 45 days.

(21) Appl. No.: 10/313,880

(22) Filed: Dec. 6, 2002

(65) Prior Publication Data

US 2003/0146277 A1 Aug. 7, 2003

(30) Foreign Application Priority Data

Dec. 6, 2001 (JP) .................................... 2001-373046

(51) Int. Cl.⁷ ................................................ G06K 5/00
(52) U.S. Cl. ................... 235/382; 235/382.5; 235/375; 235/492; 705/41; 361/737
(58) Field of Search ................................ 235/492, 375, 235/380, 486, 382, 382.5; 705/40–44; 361/737

(56) References Cited

U.S. PATENT DOCUMENTS

| | | | |
|---|---|---|---|
| 4,454,414 A | * | 6/1984 | Benton ........................ 705/41 |
| 5,408,082 A | * | 4/1995 | Takagi et al. ................ 235/492 |
| 6,005,942 A | | 12/1999 | Chan et al. |
| 6,233,683 B1 | * | 5/2001 | Chan et al. .................. 713/172 |
| 6,390,374 B1 | * | 5/2002 | Carper et al. ................ 235/492 |
| 6,481,632 B2 | * | 11/2002 | Wentker et al. ............. 235/492 |

FOREIGN PATENT DOCUMENTS

| | | |
|---|---|---|
| EP | 0933717 | 8/1999 |
| EP | 0949595 | 10/1999 |
| WO | 00/25278 | 5/2000 |

OTHER PUBLICATIONS

"Java Card(TM) 2.1.1. Runtime Environment (JCRE) Specification", Sun Microsystems, Inc., May 18, 2000, p. 3–53.

* cited by examiner

Primary Examiner—Michael G. Lee
Assistant Examiner—Ahshik Kim
(74) Attorney, Agent, or Firm—Pitney Hardin LLP

(57) ABSTRACT

Provided is an IC card capable of downloading a card manager even after issuance of the IC card. A first card manager stored in the ROM of an IC card is made to be capable of downloading a privileged application, which is an application having a privilege, and a privileged API in the ROM is made accessible from the downloaded privileged application. When the privileged application accesses the privileged API, the privileged application can operate as the card manager, so that the IC card can download a card manager even after issuance of the IC card.

6 Claims, 19 Drawing Sheets

FIG. 5

| APPLICATION | PERMISSION TO USE PRIVILEGE |
|---|---|
| AP · 0 | ○ |
| AP · 1 | × |
| AP · 2 | × |
| AP · 3 | × |
| AP · 4 | ○ |
| ⋮ | ⋮ |

FIG. 1 0

| APPLICATION | USABLE FUNCTION |
|---|---|
| AP・0 | FUNCTION 1 、FUNCTION 4 、FUNCTION 1 6 、… |
| AP・4 | FUNCTION 2 、FUNCTION 4 、FUNCTION 1 8 、… |
| ⋮ | ⋮ |

IC CARD WITH CAPABILITY OF HAVING PLURALITY OF CARD MANAGERS INSTALLED

BACKGROUND OF THE INVENTION

1. Field of the Invention

The present invention relates to an IC ("integrated circuit") card to which an application having privilege is installed.

2. Description of the Prior Art

Presently, attention is paid to an IC card as a security device. An IC card or integrated circuit card is typically a card of plastic or similar materials, such as a cash card or credit card, and includes one or more integrated circuit chips embedded therein. In the United States and Europe, the IC card is sometimes referred to as a "smart card" or "intelligent card". For the purpose of users' convenience and decreasing the entry-barrier for a business owner who wants to provide services via the IC card, a multi-application-complied card, which is a card capable of downloading applications after issuance of the card, has been under development.

Herein, a hardware constitution of the IC card is overviewed. FIG. 18 is a function block diagram regarding the hardware of the IC card. An IC card 1800 includes a CPU 1801, a ROM 1802, a RAM 1803, an EEPROM 1804, and an I/O IF 1805. The CPU 1801 performs an arithmetic operation. The ROM 1802 is a read-only memory where rewriting is impossible. Contents stored in the ROM 1802 are fixed when the IC card 1800 is manufactured, and they cannot be changed later. The RAM is a readable/writable memory. The EEPROM 1804 is also a readable/writable memory. The contents of the RAM 1803 are erased when a power source is turned off, whereas the contents of the EEPROM 1804 are held even if the power source is turned off. The I/O IF 1805 is assigned to data exchange with a unit outside the IC card. A program executed in the CPU 1801 is generally referred to as an 'application'. Codes for executing the application are stored in the ROM 1802 or the EEPROM 1804. There are cases where the IC card 1800 includes a coprocessor for encryption, which is used for encryption control, other than the case shown in FIG. 18.

FIG. 19 is a view explaining the relationships among applications executed in the CPU 1801, where an application called a card manager 1902 is in a ROM 1901 of an IC card 1900, and there also exist a privileged API (application programming interface) 1906 and a general API 1907. The card manager 1902 is an application to control an operation of an application operating in the IC card 1900. The operation control of the application is activation, termination, deletion, download, or the like of the application. The card manager 1902 performs the control in cooperation with a virtual machine (VM) or an OS of the IC card. The privileged API 1906 is an application interface for executing a privilege manipulation that the card manager 1902 uses. For example, an operation for control such as download, activation, and termination of the application is an example of the privilege manipulation. The general API 1907 is an application interface for executing an operation that does not need the privilege. An AP.1 (1903), an AP.2 (1904), and an AP.3 (1905) are applications that are stored in the ROM 1802 or the EEPROM 1804 and executed under control of the card manager 1902. Since these applications cannot execute the privilege manipulation, they can only use the general API 1907 of the application interfaces provided by the ROM 1802. The privileged API 1906 is open only to the card manager 1902 to prevent the applications other than the card manager 1902 from performing the privilege manipulation, or confirmation described below is performed to prevent the other applications from performing the privilege manipulation even in the case where the privileged API 1906 is open to the other applications. Specifically, inside the privileged API 1906, it checks with an identifier or a memory address indicated by a program counter of an application that tries to use the privileged API 1906, and thus confirms that the application is the card manager 1902.

In developing the above-described multi-application-complied card, various kinds of card managers that control downloaded applications have been examined and card managers having various kinds of specifications have been proposed. This tendency is increasing with higher demand for the IC card, and it is expected that a greater number of card manager specifications will be proposed.

However, only one card manger can be installed to a conventional IC card, and the codes of the card manager are stored in the ROM where rewriting of contents is impossible. For this reason, manufacturers have no other choice but to develop a card manger for every specification and manufacture the IC card by storing the card manger in the ROM, which is not desirable from the viewpoint of cost and man-hours. Further, this causes a general user to have many IC cards, which is inconvenient.

SUMMARY OF THE INVENTION

To solve the above-described problems, the present invention provides an IC card that has a card manager capable of downloading an application having a privilege. The application having the privilege is downloaded and operated; download, activation, termination or the like of other applications are performed under control of the application having the privilege, and thus the application having the privilege serves as the card manager. Even if the card managers having various kinds of specifications are proposed as described above, the user does not need to have a plurality of the IC cards when such card managers are downloaded as the application having the privilege. Furthermore, an operation equivalent to version upgrading of the card manager stored in the ROM can be performed as well.

When the IC card is made to be capable of downloading the application having the privilege, the application needs to be distinguished from a general application. Consequently, in the present invention, the card manager stored in the ROM has privileged AP control means that determines whether or not the downloaded application has the privilege. Further, the general application is prevented from accessing the privileged API to perform the privilege manipulation.

BRIEF DESCRIPTION OF THE DRAWINGS

FIG. 5 is an example of a table used for determining whether or not an application has a privilege.

FIG. 10 is an example of a table where usable functions are associated with each privileged application.

FIG. 12 is an exemplary view of contents of a stack of the application.

FIG. 13 is an exemplary view showing a flow of a message that the application uses when it uses a privileged API.

PREFERRED EMBODIMENTS OF THE INVENTION

In the following, preferred embodiments of the present invention will be described using the accompanying drawings. Note that the present invention is not limited to the embodiments, but various changes and modifications may be made without departing from the spirit of the invention.
First Embodiment
FIG. 1 exemplifies the function block diagram in an operation state of the IC card according to the first embodiment of the present invention. The IC card in this embodiment has a first card manager. The first card manager is capable of downloading the privileged application.
(First Embodiment: Constitution)

The 'first card manger' controls the operation of the applications inside the IC card. The operation control of the application is activation, control during execution, termination, deletion, download or the like of the application. These points are the same as the prior art.

The first card manager performs the 'operation control of the application' by using the privileged API or a general API.

The 'API' is an abbreviation of 'application interface', which is an entrance to make a module, that the application uses, become usable from the application.

The 'privileged API' is an API that only applications to which a particular right has been approved can use. An example of an application to which the particular right has been approved is the first card manager and the privileged application of this embodiment. Since the privileged API is realized by a program stored in a ROM 101 or the like, a step to realize the privileged API is referred to as a 'privileged API step'.

The 'general API' is an API that any application can use. All applications operating in an IC card 100 can use the general API. A general library function can be used by the general API. Herein, as a function of the 'general library', an operation of character strings (conjunction of character strings, a search of a particular character in the character strings, or the like), data copy, serialization of data and its opposite operation, an arithmetical operation for a multi-length integer operation, or the like are cited.
(First Embodiment: Details of the IC Card Having the First Card Manager that Downloads the Privileged Application)

In the following, detailed description will be made for the IC card of the present invention, which is the IC card having the first card manager that downloads the privileged application with the privilege by using the privileged API and the general API.

Figure 1:
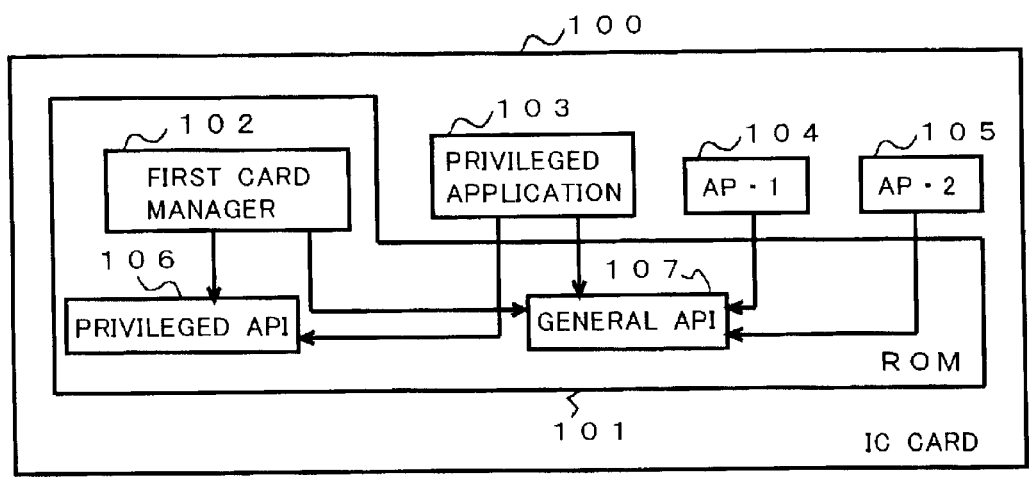
FIG. 1 is a function block diagram of an IC card in the first embodiment of the present invention.

FIG. 1 is the IC card capable of downloading (that has downloaded) the privileged application. This download is performed by the first card manager. The first card manager is realized by a program. Therefore, the program can be regarded as a card manager program that makes the IC card, which is a kind of a computer, execute a step of downloading the privileged application.

A 'privileged application' 103 is the application having the privilege. It is not stored in the ROM 101, but is downloaded by a first card manager 102 and installed from outside the IC card 100.

To 'download' is to input the application from outside to the IC card to accumulate it in a usable state.

As a result of the download, the application is stored in a writable memory such as the EEPROM. In the conventional IC card, a privileged API 106 can be used only from an application stored in the IC card 100 at the time it's manufactured, that is, the first card manager 102 stored in the ROM 101, for example. However, in the present invention, even the privileged application 103 downloaded after the IC card 100 was manufactured is allowed to use the privileged API 106.

For this purpose, modification will be made as follows to the point where the conventional IC card has checked with an address, an application identifier (hereinafter, abbreviated as 'identifier') or the like indicated by a program counter of the application that uses the privileged API 1906 and only the first card manager 102 has been allowed to use the privileged API 106, for example. Specifically, when the first card manager 102 downloads and activates the privileged application 103, its identifier or the like is registered to the RAM 1803, the EEPROM 1804, or the like assuming that the privileged application 103 is the application capable of using the privilege, for example. The privileged API 106 confirms that the identifier or the like of the application that uses the API is one of the applications capable of using the privilege, and allows the application to use the privilege manipulation.
(First Embodiment: an Example where a Setting Change of the IC Card can be Done Later)

Therefore, a privileged application 201 that the first card manager 102 has downloaded can use the privilege as well in the present invention. This makes it possible to change a setting of the IC card (transition to a power saving mode, for example). Consequently, by downloading the privileged application after issuance of the IC card, the setting of the IC card can be changed.
(First Embodiment: an Example where Even an Application Installed Later can Access Confidential Information)

Further, there is a case where access to particularly highly confidential information such as a bank account number, a password, a balance, and an expiry date of the IC card, among information stored in the IC card 101 is restricted by the privileged API 106. In the IC card of this embodiment, the application to access such information and perform processing can be downloaded to the IC card after issuance of the IC card.

(First Embodiment: an Example where Compliance to New Protocol is Made Possible after Issuance of the IC Card)

Furthermore, even in the case where a settlement processing is performed based on a new protocol, only downloading the privileged application that operates based on the new protocol to the IC card of this embodiment is enough, and there is no need to issue another IC card.

(First Embodiment: Description of the Privilege)

Next, description will be made for the IC card where the 'privilege' is one or more of: an application is capable of using the card privilege control means; an application itself is not deleted; an application capable of becoming a default application; and an application capable of using resources for high response.

Herein, the 'privilege', that the privileged application 103 has, is capable of using the privileged API 106. By using the privileged API 106, the application can use the card privilege control means, the application itself is not deleted, can be the default application, and can use a function to enable the application to use resources for high response.

The 'card privilege control means' is various kinds of means that control the application. Details will be described later.

The 'default application' is an application that is activated first (or a series of applications that are activated first) when the operation of the IC card starts.

The 'use of resources for high response' means to use resources in the IC card to perform a processing having real-time behavior such that a processing to open an automatic ticket gate is performed.

Further, two or more functions cited above may be used simultaneously.

(First Embodiment: Description of the Card Privilege Control Means)

Next, description will be made for the IC card in which the 'card privilege control means' has one or more of: a control function for a life cycle of the application; a download/delete function; a signature verification function for the application to be downloaded; a firewall providing function for the application; and a function that can be operated by the privileged API to operate a memory/communication control function.

The 'card privilege control means' is various kinds of means that control the application as described above. Specifically, functions such as the control function for the life cycle of the application; the download/delete function; the signature verification function for the application to be downloaded; the firewall providing function for the application; and the memory/communication control function are relevant.

The 'life cycle of the application' shows whether or not the application is in a downloaded state, whether or not the application is in a selectable state for activation, whether or not it is in a selection impossible state, or the like.

The 'control function for a life cycle of the application' is a function to control the state of the application, which makes transition from the selectable state to the selection impossible state of the application, or makes transition to an opposite direction. Further, in addition to the transition, the control function for the life cycle of the application of the present invention can also control the state from activation to termination and deletion of the application.

The 'download/delete function' is a function that downloads the application to install it to the IC card and to make it usable (to introduce the application, for example), and a function to erase the application implemented to the IC card to make it unusable (to uninstall the application, for example). By using this function, it is possible to download and install the application to make it usable, and uninstall it when the application becomes unnecessary to return the IC card to the state before installation, for example.

The 'signature verification function for the application to be downloaded' is a function to verify whether or not a signature added to the application implemented to the IC card by the download function is correct. A specific example of this function is a function to verify whether or not the application has been tampered, for example. Since the signature verification function verifies whether or not the downloaded application performs an unauthorized operation, the function is made to be a function of the card privilege control means because it is an important function for the IC card.

The 'firewall function for the application' is a function to control the applications in the IC card to avoid adverse effects with each other.

The 'memory/communication control function' is a function to control a memory that the application uses or to control the I/O IF 1805.

The card privilege control means is usable by the privileged API 1906, and is realized by the program stored in the ROM 101. Thus, a step to realize the card privilege control means is referred to as a 'card privilege control step'. Therefore, the card manager program that realizes the first card manager of this embodiment can use the card privilege control step by using the privileged API 1906.

(First Embodiment: Capable of Implementing a Second and a Third Card Manager)

Further, since the privileged application 103 to be downloaded can use the privileged API as described above, it is possible for the privileged application 103 to be downloaded to perform activation, control during execution, termination, deletion, download, or the like of the application. Thus, the application to be downloaded can have a function as the card manger.

Specifically, the second and third card managers can be implemented to the IC card in addition to an original card manager that has been previously written in the ROM. Thus, version upgrading or updating of the card manager itself can be performed without replacing the IC card itself.

(First Embodiment: The Downloaded Privileged Application Provides the Privileged API for another Application: Interface)

Figure 2:
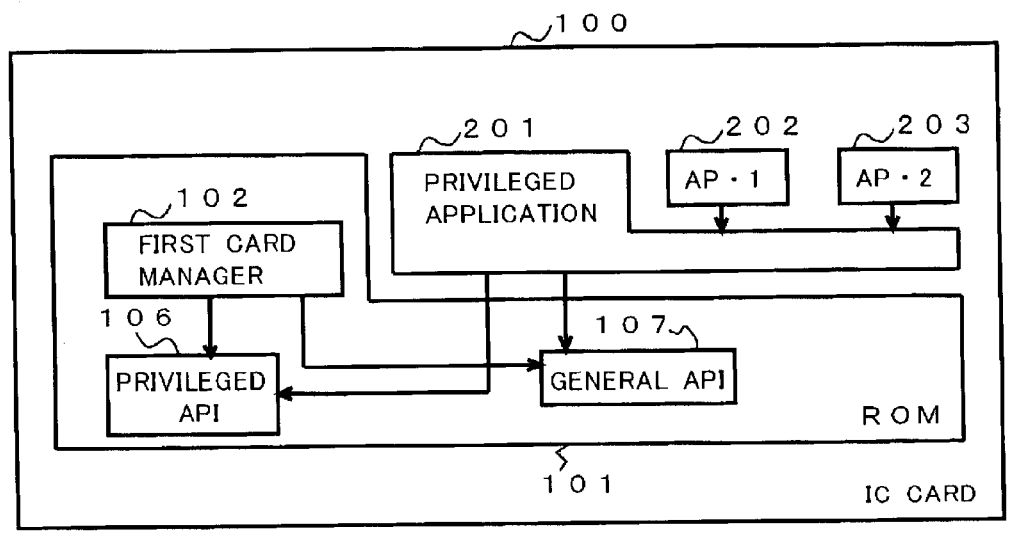
FIG. 2 is a function block diagram of the IC card when a privileged application downloaded in the first embodiment has a card manager.

FIG. 2 exemplifies that the downloaded privileged application 201 provides functions, which are provided by the privileged API 106 or a general API 107, for other applications AP.1 (202), AP.2 (203) and the like.

Therefore, the privileged application in FIG. 1 is different from the one in FIG. 2 from the point that it may operate independently of the AP.1 (202) and AP.2 (203).

On the other hand, in FIG. 2, the downloaded privileged application 201 provides the functions, which are provided by the privileged API 106 or the general API 107, for the other applications AP.1 (202) and AP.2 (203) (in other words, the downloaded privileged application 201 is made to have an interface section (not shown), or a downloaded grandchild application being the privileged application). Alternatively, the privileged application changes the life cycle of the applications and performs control. Note that the AP.1 (202) and AP.2 (203), when using the function of the general API, do not necessarily have to use the function of the general API provided by the privileged application 201, but also can directly use the general API 107.

(First Embodiment: the Grandchild Application is Capable of Becoming the Privileged Application, that is, the Card Manager for Example)

Moreover, it is possible that the downloaded privileged application 201 downloads the privileged application, and the downloaded privileged application operates as the card manager by the privileged API provided by the privileged application 201.

Specifically, it is possible that the privileged application 201 that operates as the card manager downloads another card manager, and it is operated under control of the privileged application 201. In other words, assuming that the privileged application 201 is an application corresponding to a child (hereinafter, abbreviated as 'child application') viewed from the first card manager 102, a state can be realized that an application downloaded by the privileged application 201 (in short, an application corresponding to a grandchild for the first card manger 102 (hereinafter, abbreviated to 'grandchild application')), which is a child application, operates as the card manager as well.

(First Embodiment: with Capability of Downloading the Privileged Application, the Difference of Application Download Procedure can be Absorbed)

Consequently, a procedure difference in application download can be absorbed, for example. Specifically, even if an application that needs to be downloaded in a different procedure is provided after issuance of the IC card, the application can be downloaded by downloading and operating a card manager that complies with the procedure.

(First Embodiment: Downloading of the Privileged Application can Cope with a Specification Change of the Privileged API)

Further, the privileged application 201 receives the result that the privileged application has obtained from the privileged API 106 or the general API 107 in response to the demand from the AP.1 (202) or the like, and returns it to the AP.2 (203) or the like. As a result, the privileged application 201 becomes capable of providing the API as the general API 107 stored in the ROM 101 can provide. Accordingly, even if a specification of a new privileged API or a new general API is proposed and adopted, the IC card can cope with the specification when it downloads the privileged application that complies with the specification. Thus, there will be no need to issue the IC card every time the specification of the privileged API or the like changes.

(First Embodiment: The First Card Manager Controls Applications under Control of the Second Card Manger)

Next, description will be made for the IC card in which, in the case where the child application downloaded by the first card manager is the privileged application that has the second card manager capable of further downloading the grandchild application, the first card manger can change the life cycle of the grandchild application or delete the grandchild application.

'The privileged application that has the second card manager' is a privileged application downloaded by the first card manager and it is an application that can operate as the card manager. Specifically, the privileged application downloads another application and can change the life cycle of the application that operates the application or can delete the application.

'The change of the life cycle or deletion of the application' means a change of the application and/or a deletion of the application.

Note that an application that is the privileged application downloaded by the first card manager and capable of operating as the card manager is referred to as the 'second card manager'.

(First Embodiment: Problems when a Plurality of Card Mangers Exists)

FIG. 2 exemplifies a state where the grandchild application (AP.1 (202) or the like) operates under control of the second card manager when the child application downloaded by the first card manager 102 is the second card manger 201. In such a case, the dominance between the first card manager 102 and the second card manager (privileged application 201) is a problem.

The 'dominance' is a difference of control authority between the first card manager and the second card manager and validity of the control authority when competition of control contents is expected, and it means whether or not the first card manager can change the life cycle of the application or delete the application that operates under the control of the second card manager, for example.

The following cases are cited as an example where the dominance is a problem. Specifically, it is assumed that the second card manager has downloaded an application whose operation has an expiry date and operates the application. If the second card manager does not stop the application despite the fact that the expiry date for operation has passed, whether or not the first card manager can stop the application becomes a problem. Similarly, when the expiry date has passed, whether or not the first card manager can delete the application to secure a storage capacity is a problem as well.

Note that one of the causes for the case where the second card manager does not stop the application, even in the case that the expiry date has passed, is a bug in the second card manager. Furthermore, another cause is that creators of the first card manager and the second card manager are different, but creators of the second card manager and the application that the second card manager downloads are the same. In the second case, the creator of the second card manager intends to operate the downloaded application as long as it can, and, on the other hand, the creator of the first card manager intends to appropriately distribute the resources of the IC card. In such a case, the two intensions contradict each other, and there is a need to resolve the contradiction.

(First Embodiment: Solving Means for the Above-described Problems)

Technically, however, the grandchild application operates under the VM or the OS, which is a function the first card manager 102 of the IC card, and is considered to be under control of the first card manager 102, although indirectly. For this reason, it is not impossible for the first card manager 102 to change the life cycle of the grandchild application or to delete the grandchild application. Then, as a resolution for the problem of the dominance, the first card manager 102 may change the life cycle of the grandchild application or may delete the grandchild application. On the other hand, it is a matter of course that the constitution may prohibit these operations. Further, the second card manager may be capable of changing the life cycle of the application or deleting the application, which the first card manager 102 has downloaded.

(First Embodiment: Details for the Case where the First Card Manager Controls the Application under Control of the Second Card Manager)

Detailed description will be made as follows for a realizing method for the case in which the first card manager changes the life cycle of the grandchild application or deletes the grandchild application. One realizing method is as follows. Specifically, when the privileged application 201 downloads the grandchild application, the privileged application 201 outputs information that it has downloaded the grandchild application to the first card manager 102, and notifies the first card manager 102 of information necessary to control (change of the life cycle or deletion of the application, for example) the grandchild application, such as an address of a region where the grandchild application has been downloaded, a size, or a grandchild application name.

Further, when the privileged application 201 activates the grandchild application, it notifies the first card manager 102 of information regarding the activated grandchild application, it notifies of a memory region allocated for the activated grandchild application, an application identifier to operate the application, or the like, for example. When the privileged application 201 has terminated the operation of the grandchild application, it notifies the first card manager 102 of the termination of the grandchild application. In a similar manner, when the privileged application 201 has deleted the grandchild application, it notifies the first card manager 102 of information regarding the deletion.

With this procedure, the first card manager 102 can know the control status of the application operated by the privileged application 201, and the first card manager 102 becomes capable of changing the life cycle of the grandchild application, deletion of the grandchild application, or the like. And thus, in the case where the child application downloaded by the first card manager 102 is the privileged application 201 that has the privilege capable of further downloading the grandchild application, the first card manager 102 becomes capable of changing the life cycle of the grandchild application or deleting the grandchild application.

Note that the information that the privileged application 201 downloaded the grandchild application to the first card manger 102, or the like does not need to be output directly from the privileged application 201 to the first card manager 102, but may be output from the privileged application 201 indirectly to the first card manager 102 via the privileged API 106.

Further, in such a case, the privileged application 201 does not need to clearly specify the first card manager 102 as an output destination. For example, when the privileged application 201 has downloaded the grandchild application using the privileged API 106, which card manager has performed the download is checked inside the privileged API 106. If it is determined that the second card manager has performed a download, information that a download has been performed may be output to the first card manager 102. In addition, the application is controlled by the VM or the OS of the IC card, the first card manager obtains information for controlling all applications, and may control the application based on the information obtained.

(First Embodiment: The First Card Manager cannot Control the Application Under Control of the Second Card Manager)

Furthermore, description will be made for the IC card in which the second card manager can prohibit the first card manager from changing the life cycle of the grandchild application or deleting the grandchild application.

(First Embodiment: Details for the Case where the First Card Manager cannot Control the Application Under Control of the Second Card Manager)

Specifically, on the contrary to what has been described above, the second card manager can prohibit the first card manager from changing the life cycle of the grandchild application or deleting the grandchild application. One realizing method is as follows. No information is output to the first card manager 102 even if the privileged application 201 performs download, activation, termination, or deletion of the grandchild application, or alternatively, information showing which card manager controls each application is stored in the IC card 100 by use of the privileged API 106 and the privileged API 106 is formed such that the life cycle of the application, which is under control of another card manager, cannot be changed.

(First Embodiment: a Case where the Second Card Manager can Control the Application Under Control of the First Card Manager)

Further, the second card manager may be capable of changing the life cycle of the application that the first card manger has downloaded and deleted the application.

(First Embodiment: a Realizing Method that the Second Card Manager Becomes Capable of Controlling the Application Under Control of the First Card Manager)

As one method to realize this, there exists a method that when the first card manager has downloaded the application, the first card manager notifies the second card manager of information to control the downloaded application.

Alternatively, control may be performed as follows when the information necessary for controlling the application such as the life cycles of all applications downloaded to the IC card is held in the VM or the OS. Specifically, the second card manager reads out the information held in the VM or the OS, and changes the life cycle of the application or deletes the application, that the first card manager has downloaded. By using such a method, the second card manager becomes capable of changing the life cycles of not only the application downloaded by the first card manager but all the applications operating in the IC card and deleting the applications.

(First Embodiment: a Mode in which Selection Means for Selecting the Dominance Is Provided)

Further, in the case where the child application downloaded by the first card manager 102 is the privileged application 201 that has the privilege capable of further downloading the grandchild application, the IC card may have selection means capable of selecting the dominance between the privilege that the first card manager 102 has and the privilege that the second card manager has.

To realize such selection means, an application that accepts a signal to select the dominance from the I/O IF 1805 may be allowed to operate in the IC card, or exclusive hardware for mounting the selection means may be provided for the IC card. The privileged API 106, the general API 107, the first card manager, and the privileged application 201 refer to a selection result by the selection means, and thus an operation according to the selected dominance can be realized.

(First Embodiment: The Relationship Between the First Card Manager and the Second Card Manager also Holds True between other Card Managers)

In the aforementioned, description has been made for the relationship between the first card manager and the privileged application having the second card manager, which is the child application of the first card manager, but the present invention is not limited to such a case. For example, in the case where the second card manager further downloads the application having the privilege (referred to as a grandchild privileged application) and the grandchild privileged application has a third card manager, the present invention can be applied to a relationship between the third card manager and the first card manager, a relationship between the third card manager and the second card manager, and furthermore, a relationship between the third card manager and a fourth card manger, a fifth card manager, and so on.

(First Embodiment: Brief Description of Effects)

In the Embodiment described above, the first card manger 102 can download the privileged application that is the application having the privilege. Thus, the privileged application that performs the setting of the IC card can be downloaded after issuance of the IC card to change the setting, or the application that manipulates data that cannot be obtained without the privilege can be downloaded. As a result, this makes the IC card become capable of coping with the protocol for a new business transaction, for example. Further, since such a privileged application can operate as the card manager, it can absorb the difference in download procedure for the application. Alternatively, it can provide an interface of new specifications for the grandchild application. Specifically, downloading the privileged application to the IC card is enough, and there will be no need to issue another IC card.

Further, since the first card manager is made capable of changing the life cycle of the grandchild application that the second card manger has downloaded or deleting the grandchild application, when the expiry date for the operation of the grandchild application has passed, for example, the first card manager can terminate the operation of the application or can delete the application. Furthermore, when the second card manager prohibits the first card manger from changing the life cycle of the grandchild application or deleting the application, the second card manager becomes dominant over the first card manager. Thus, the second card manager can be used instead of the first card manager, and one equivalent to the version upgrading or updating of the card manger can be realized.

Second Embodiment

Next, description will be made for the IC card in which the first card manager has privileged AP control means for determining whether or not the application has the privilege.

(Second Embodiment: Constitution)

Figure 3:
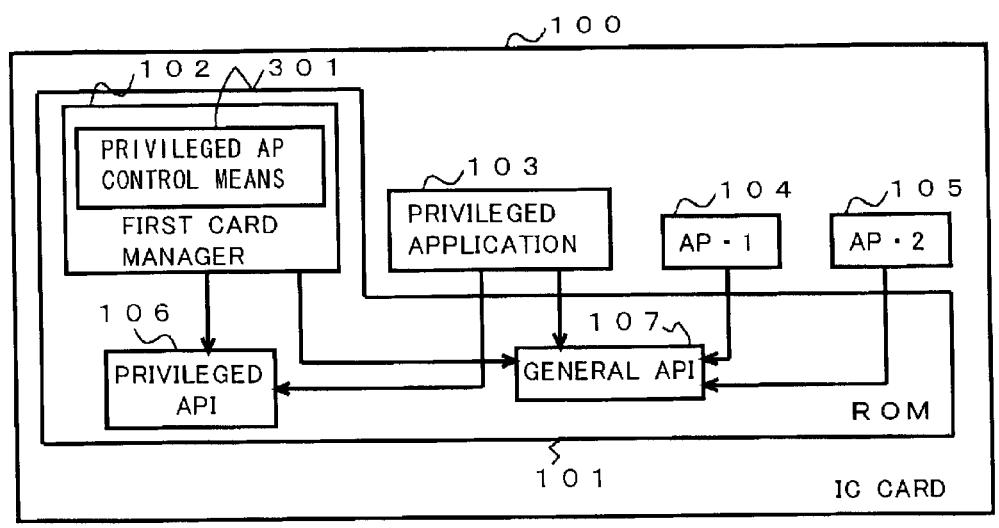
FIG. 3 is a function block diagram of the IC card in the second embodiment of the present invention.

FIG. 3 shows the function block diagram of the IC card in the second embodiment of the present invention. In this embodiment, privileged AP control means 301 is added to the function block diagram of FIG. 1 in the first embodiment. In this embodiment, the first card manager 102 has the privileged AP control means 301. The privileged AP control means 301 is means for determining whether or not the application has the privilege.

(Second Embodiment: A Method of Determining whether or not the Application has the Privilege)

As one method to determine whether or not the application has the privilege, there exists a method in which an application attribute showing whether or not it has the privilege is added to the application. Specifically, when the IC card has downloaded the application, it checks the application attribute and approves the application having the attribute of the privilege.

However, this method can easily add the attribute of the privilege to an application performing an unauthorized operation, approving the application performing the unauthorized operation of the privilege.

(Second Embodiment: A Method of Determination=a Signature)

Figure 4:
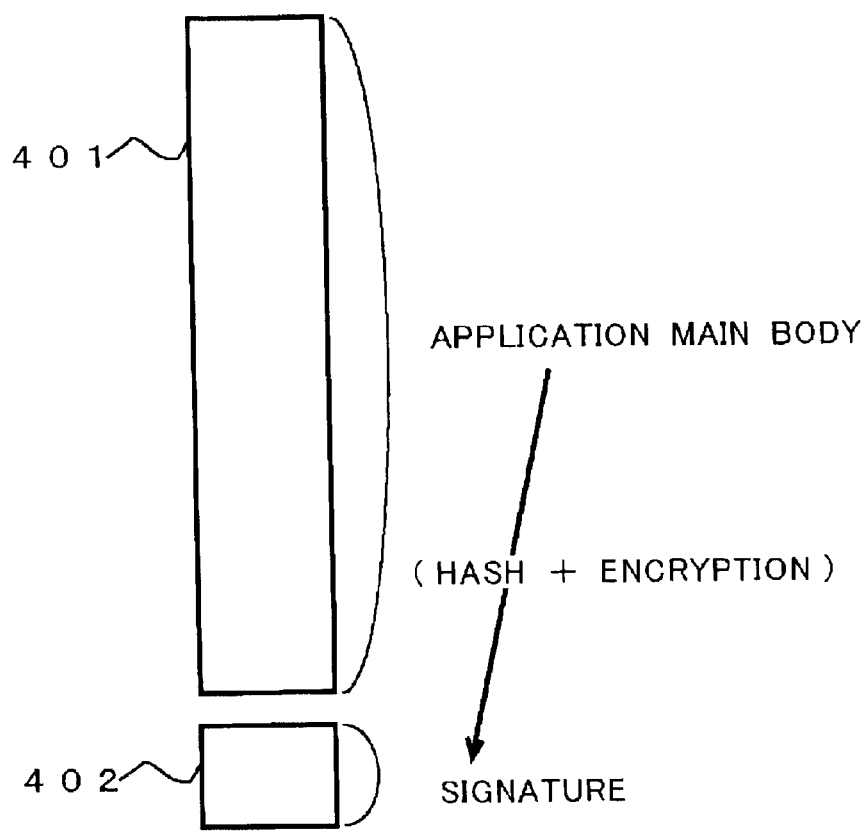
FIG. 4 is a view showing the relationship between an application main body and a signature.

There exists a method of adding a signature to the application as one method of preventing the above-mentioned. FIG. 4 shows the relationship between an application main body and the signature. The 'application main body' is information necessary for executing the application. For example, it is application control information that stores execution codes of the application, parameter passed to the application, or the like. FIG. 4 shows that a signature 402 is obtained by finding a hash value from an application main body 401 and encrypting it. The 'hash value' is an output value by a function, where finding two different data such that the output values match is difficult from a complexity point of view. An SHA-1 (secure hash standard-1), an MD5 (message digest 5), or the like, is known as the function, where the SHA-1 associates an input data with the hash value of 160 bits and the MD5 associates the data with the hash value of 128 bits.

The signature is one that the output value of the hash function has been encrypted. When a public key cryptography is used as encryption, one that a person who guarantees the operation of the application has encrypted the hash value by his/her private key is the signature. Note that there are cases where the private key used in encryption is a private key of the person who has created the application, the person who distributes the application or the like, and moreover, the private key may be the one of the person who guarantees the operation of the application. It is possible to know a source of the application, or the like, by knowing whose private key has been used to encrypt to get the output value. Through verification of the signature that has been generated in this manner, confirmation can be made whether or not the application main body performs an unauthorized operation. For example, the first card manager 102 of the IC card 100 downloads the application main body 401 and the signature 402, decrypts it by a public key of the person who generated the signature 402, and, on the other hand, the hash function used when generating the signature is applied to the application main body 401 to obtain the hash value, and thus whether or not the operation of the application main body has been guaranteed can be determined by checking if the decryption result and the hash value are identical.

(Second Embodiment: Control of a Verification Result of whether or not the Application has the Privilege or the Signature is Correct)

The privileged AP control means 301 may control the result of whether or not the application downloaded by the first card manager 102 has the privilege or that the correctness of the signature has been verified according to the table shown in FIG. 5. In the table of FIG. 5, the left column shows an identifier (a name, for example) of the application that the first card manager 102 has downloaded, and the right column shows whether or not use of the privilege by the application is approved. For example, '○' shows a permission of use of the privilege for the application, while 'X' shows that use of the privilege is not permitted. Note that the signature may be verified at the time of downloading the application, or alternatively, the application and the signature have been previously stored and the signature may be verified when activating the application or when the application tries to use the privileged API 106.

When access from the application has been made, the privileged API 106 refers to the table of FIG. 5 to check whether or not it is the access from the application for which use of the privilege has been permitted. It then performs an expected operation, if it is the access from the application for which use of the privilege has been permitted, or returns an error if not.

(Second Embodiment: a Processing Flow of the Privileged AP Control Means)

Figure 6:
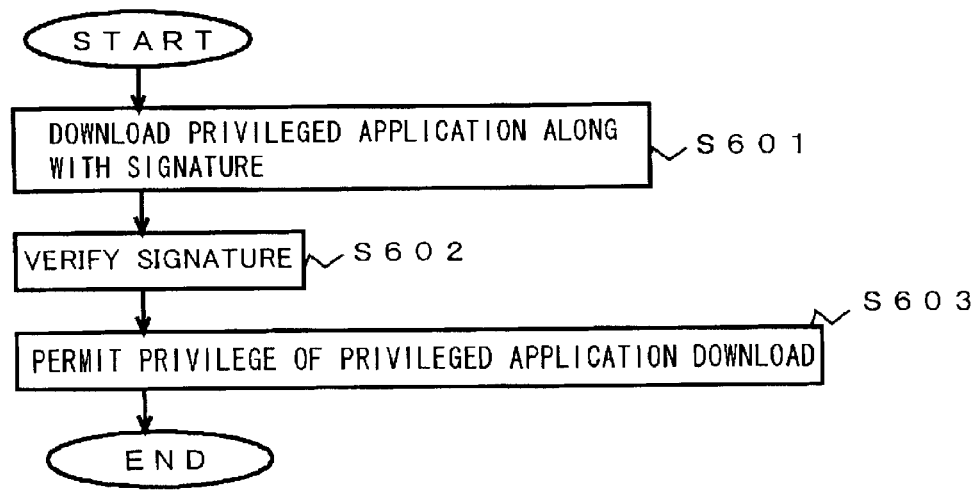
FIG. 6 is a processing flowchart for deciding whether or not the privilege of the application is permitted by using privileged AP control means.

FIG. 6 shows the flowchart explaining the operation of the first card manager 102 in this embodiment. In step S601, the privileged application is downloaded along with the signature. In step S602, the signature is verified. When the signature can be verified, the privilege of the downloaded privileged application is permitted. Note that the signature verification does not need to be performed when downloading the privileged application, but may be performed by the time when the privileged application accesses to the privileged API 106. For example, the signature may be verified when the privileged application accesses the privileged API 106 for the first time.

The privileged AP control means 301 is realized by a card manager program that realizes the first card manager. Consequently, a step to realize the privileged AP control means 301 in the card manager program is referred to as a 'privileged AP control step'.

(Second Embodiment: Associating the Privileged Application with a Function that the Privileged Application can Use)

Next, description will be made for the IC card in which a function based on the privileged API is made up of a plurality of functions and the privileged AP control means has a privileged AP identifying information control function that associates the function, which the privileged application can use, and the privileged application for every privileged application.

The 'function based on the privileged API 106' is a function that can be realized by accessing to the privileged API 106.

The 'function based on the privileged API is made up of a plurality of functions' means that a function that can be realized by accessing the privileged API 106 is provided by a plurality of functions (or methods).

The 'privileged AP identifying information control function' is a function that associates the function, which the privileged application can use, and the privileged application for each privileged application. This function can be realized by the table shown in FIG. 10 that consists of a column named 'application' and a column named 'usable function', for example. The column named 'application' stores information for identifying the privileged application, and the column named 'usable function' stores information for identifying the function that each privileged application can use. When access has been made to the privileged API 106, confirmation is made that the application accessed is the one for which use of the privilege has been permitted, and FIG. 10 is checked to confirm that the function, which the application tries to use, is stored in the column named 'usable function'.

(Second Embodiment: Usable Function is in a Unit of Blocks)

Further, functions that provide functions, which can be realized by accessing the privileged API 106, were previously divided in blocks that are sets of a few functions, and information identifying the blocks may be stored in the column named the 'usable function' of the table in FIG. 10. With such a procedure, even in the case where a large number of functions that an application can use exist, the information to be stored can be made smaller because the information identifying the blocks may be stored. Therefore, this method is preferable for the IC card whose storage region is limited (small).

(Second Embodiment: Brief Description of Effects)

Since the IC card in this embodiment has the first card manager, which has the privileged AP control means that determines whether or not the downloaded application has the privilege, a possibility of approving the application having an unauthorized operation of the privilege, for example, is eliminated. Furthermore, permission of the privileged operation can be controlled for every downloaded application in a function level or a block level that is a set of functions.

Third Embodiment

Next, description will be made for the IC card in which the first card manager has a privileged API use demand receiving section that receives a privileged API use demand, which is a demand to use the privileged API from the application, and an interface section, which enables the privileged application to use the privileged API, in the case where a determination result of the privileged AP control means of the first card manager based on the privileged API use demand is that the application is the privileged application.

(Third Embodiment: Constitution)

Figure 7:
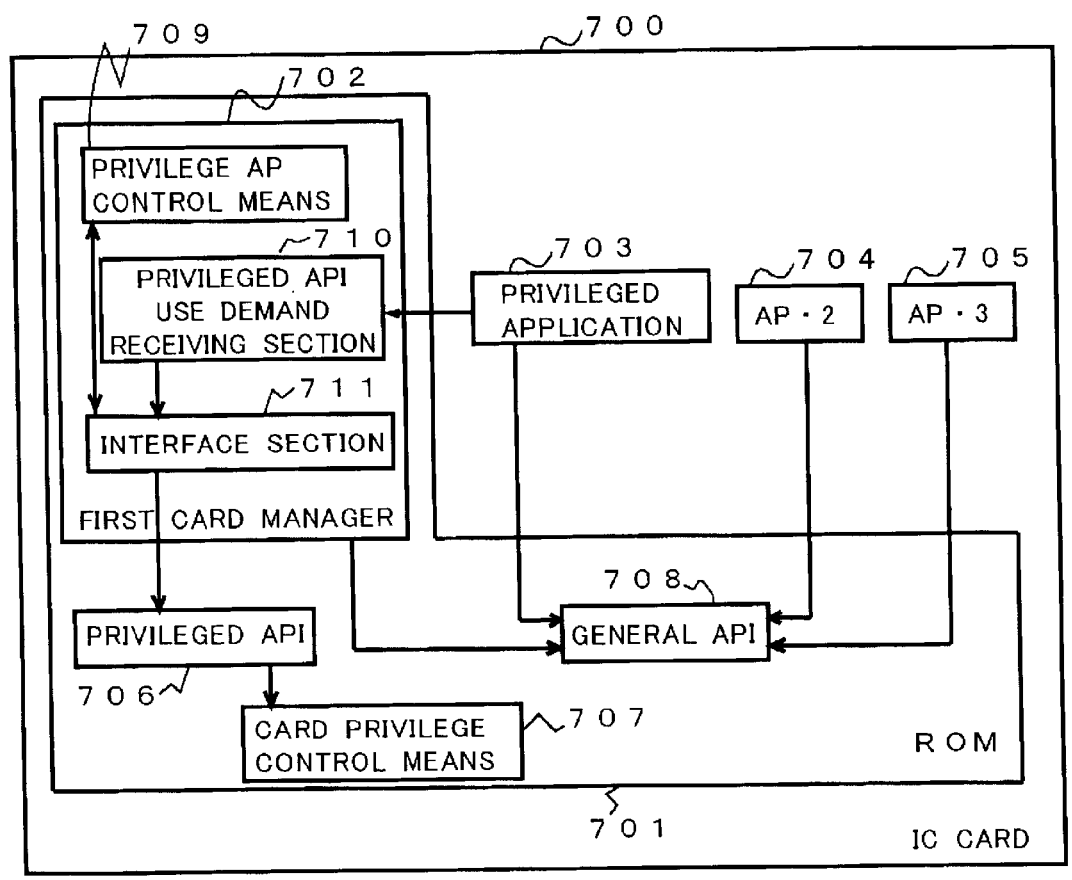
FIG. 7 is a function block diagram of the IC card in the third embodiment of the present invention.

FIG. 7 is a function block diagram of the IC card according to the third embodiment of the present invention. An IC card 700 of this embodiment has a ROM 701, and a first card manager 702, a privileged API 706, a general API 708, and card privilege control means 707 exist in the ROM 701. The first card manager 702, the privileged API 706, the general API 708, and card privilege control means 707 correspond to the first card manager 102, the privileged API 106, a general API 107, and card privilege control means (not shown), respectively in the first and second embodiments.

This embodiment is characterized in that the first card manager 702 has a privileged AP control means 709, a privileged API use demand receiving section 710, and an interface section 711.

(Third Embodiment: Difference from the Second Embodiment)

The difference between FIG. 7 corresponding to this embodiment and FIG. 3 corresponding to the second embodiment is that a determination method as to whether or not an application may be permitted to use the privileged API when the application tries to use the privileged API is more detailed in this embodiment.

(Third Embodiment: an IC Card Expected to be Used)

Note that this embodiment is on the assumption that an IC card of a Java Card type is mainly used, and is suitable for an IC card having a software architecture where the OS and the VM of the IC card are provided.

(Third Embodiment: Constitution)

The 'privileged AP control means' 709 determines whether or not the application has the privilege. Specifically, it has the same operation as the privileged AP control means 301 in the second embodiment, and controls the table shown in FIG. 5 that describes whether or not use of the privilege is permitted for every application.

The 'privileged API use demand receiving section' 710 receives the privileged API use demand, which is the demand to use the privileged API from the application. Therefore, when the application uses the privileged API 706, it does not directly access the privileged API 706 but outputs the privileged API use demand to the privileged API use demand receiving section 710.

The 'interface section' 711 allows the privileged application to use the privileged API 706, in the case where a determination result of the privileged AP control means 709 of the first card manager based on the privileged API use demand is that the application is the privileged application.

The 'determination result of the privileged AP control means 709 of the first card manager based on the privileged API use demand' is a result that the privileged AP control means 709 has determined whether or not the application, which output the privileged API use demand to the privileged API use demand receiving section 710, is permitted to use the privilege.

When it has been found out that use of the privilege is permitted according to the determination result, the interface section enables the application, which output the privileged API use demand, to use the privileged API 706. For example, the interface section transfers the privileged API use demand received by the privileged API use demand receiving section 710 to the privileged API 706. Alternatively, it issues a ticket (license) to approve the use of the privileged API 706 for the application, which output the privileged API use demand to the privileged API use demand receiving section 710, and the application may present the ticket issued by the interface section for the privileged API 706 to use the privilege manipulation.

(Third Embodiment: a Processing Flow of the IC Card Based on the Determination Result by the Privileged AP Control Means of the First Card Manager)

Figure 8:
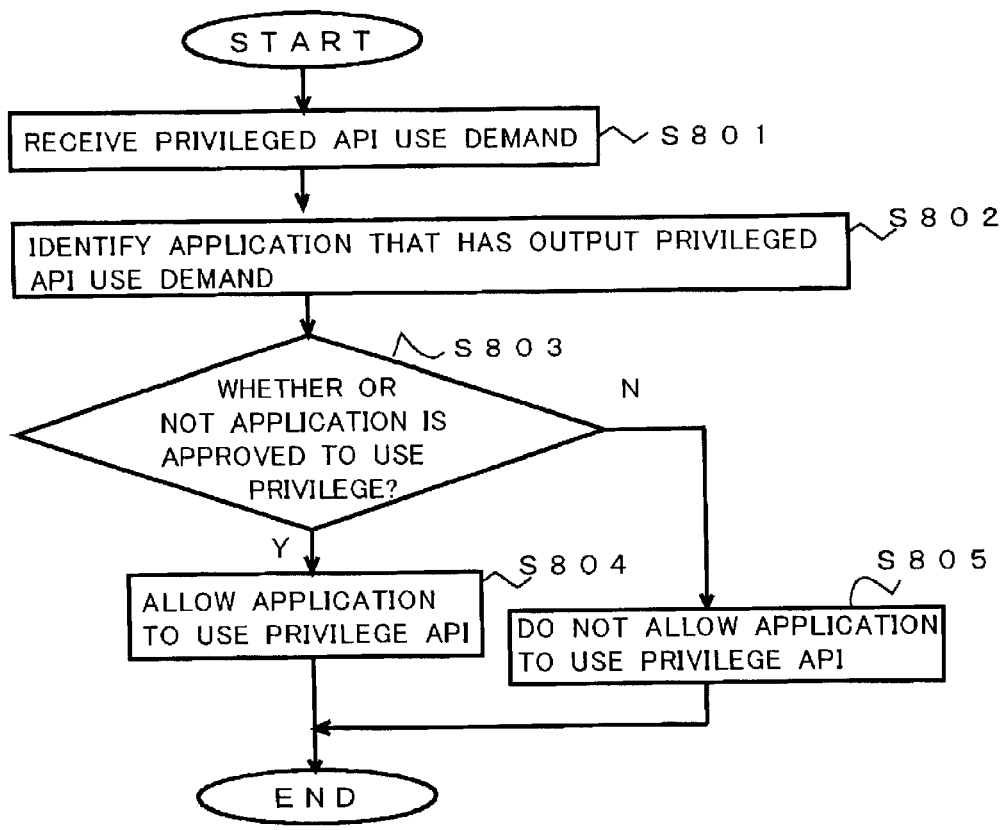
FIG. 8 is a flowchart explaining the operation of a first card manager in the third embodiment of the present invention.

FIG. 8 is the flowchart explaining the operation of the first card manager 709. In step S801, the privileged API use demand receiving section 710 receives the privileged API use demand. In step S802, the IC card identifies the application that output the privileged API use demand. In step S803, the privileged AP control means 709 determines whether or not the identified application has been permitted to use the privilege. If the use of privilege has been permitted, the application that has made the receiving section 710 receive the privileged API use demand is allowed to use the privileged API 706, in step S804. If the use of privilege has not been permitted, the application is not allowed to use the privileged API 706.

(Third Embodiment: Brief Description of the Effects)

With this embodiment, when the privileged API 706 is provided so as to be accessed from the application via the interface section 711, the privileged API of the conventional IC card can be directly used because only the first card manager accesses the privileged API 706. Further, when the interface section 711 issues the ticket to use the privileged API 706, the application, which is not permitted to use the privilege by the privileged AP control means 709, cannot perform the privilege manipulation because only applications that have obtained the ticket can use the privileged API 706, and thus security can be ensured.

Fourth Embodiment

Next, description will be made for the IC card in which the privileged AP control means of the first card manager, in the case where the application tries to directly use the privileged API and the determination result of the privileged AP control means is that the application is the privileged application, allows the privileged application to directly use the privileged API.

(Fourth Embodiment: Constitution)

Figure 9:
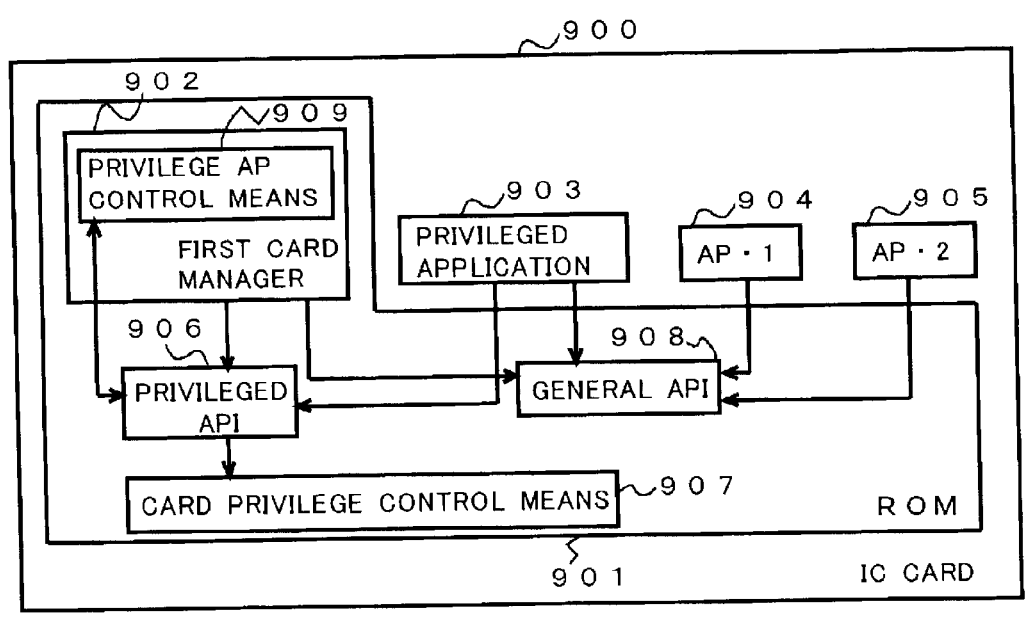
FIG. 9 is a function block diagram of the IC card in the fourth embodiment of the present invention.

FIG. 9 shows the function block diagram of the IC card according to the fourth embodiment of the present invention. In FIG. 9, an IC card 900 has a ROM 901, and a first card manager 902, a privileged API 906, a general API 908, and card privilege control means 907 exist in the ROM 901. The first card manager 902, the privileged API 906, the general API 908, and the card privilege control means 907 correspond to the first card manager 102, the privileged API 106, a general API 107, and card privilege control means (not shown), respectively in the first and second embodiments.

This embodiment is characterized in that the first card manager 902 has a privileged AP control means 909, and when access has been made to the privileged API 906, the privileged AP control means 909 determines whether or not the application, which accessed the privileged API 906, has been permitted to use the privilege. This embodiment is on assumption that the IC card of the Native type is mainly used, and it is suitable for an IC card having a software architecture in which the VM is not provided between the OS and the application and the application directly accesses the OS.

The 'privileged AP control means' 909 determines whether or not the application has the privilege. Specifically, it has the same operation as the privileged AP control means 301 in the second embodiment, and controls the table shown in FIG. 5 that describes whether or not use of the privilege is permitted for every application. Furthermore, in this embodiment, the privileged AP control means 909, in the case where the application tries to directly use the privileged API 906, allows the privileged application to directly use the privileged API 909 when the determination result of the privileged AP control means 909 is that the application is the privileged application.

'The application tries to directly use the privileged API 906' means that the privileged application 903 directly accesses the privileged API 906 stored in the ROM 901 as shown in FIG. 9, unlike the case shown in FIG. 7.

'The determination result of the privileged AP control means 909' is a determination result by the privileged AP control means 909 regarding whether or not the application that has accessed the privileged API 906 is permitted to use the privilege.

'To allow the privileged application to directly use the privileged API 909' is that the privileged AP control means 909 permits the privileged application, which is the application permitted to use the privilege by the privileged AP control means 909, to directly use the privileged API 906.

Therefore, in this embodiment, when the application has directly accessed to the privileged API 906, the privileged API 906 makes the privileged AP control means 909 determine whether or not the application that has made access is the one permitted to use the privilege. When the privileged AP control means 909 has determined that the application was the one permitted to use the privilege, it outputs a signal that makes the application access the privileged API to the application that accessed the privileged API 906.

(Fourth Embodiment: Brief Description of Effects)

With this embodiment, only application permitted to use the privilege can use the privileged API 906, and thus security is maintained. In addition, the application is capable of directly using the privileged API 906, which can avoid overhead due to use of the privileged API 906 halfway between another interface, and the privileged API 906 can be efficiently used.

Fifth Embodiment

Next, description will be made for the IC card in which the interface section of the first card manager prohibits the application from using the privileged API via the interface section of the privileged application. (prohibition of sublet of the interface for the privileged API)

(Fifth Embodiment: Constitution)

Figure 11:
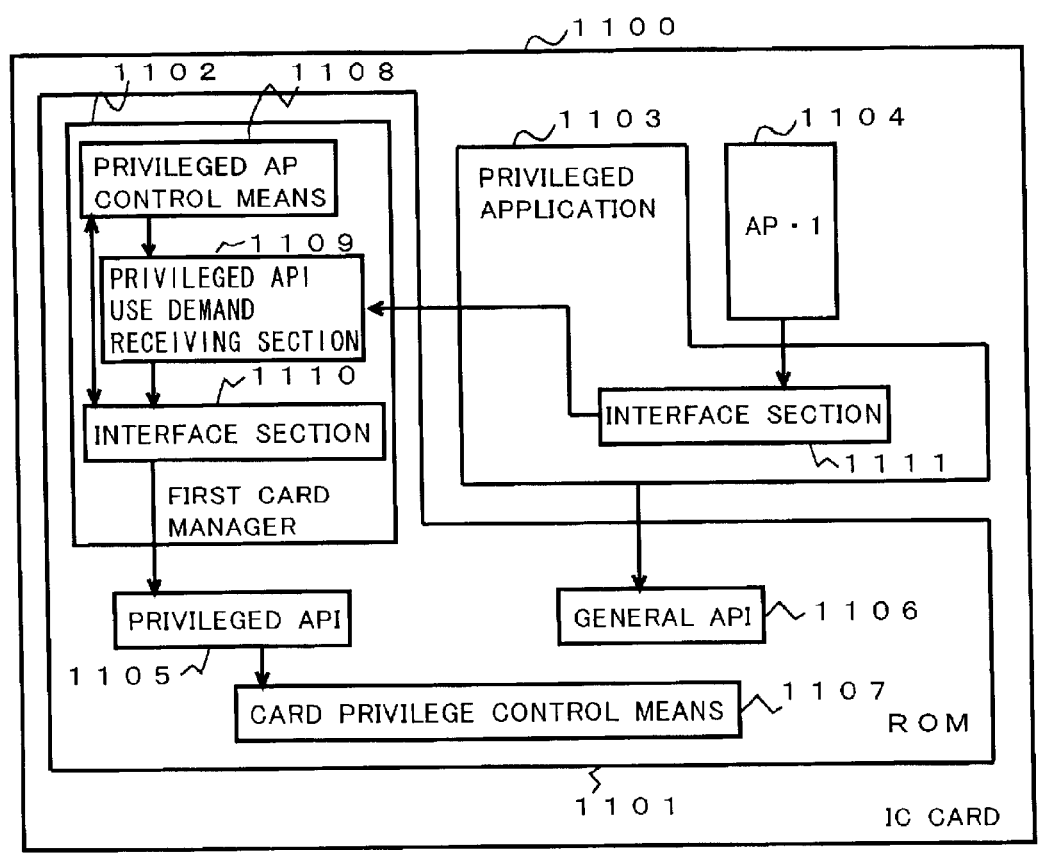
FIG. 11 is a function block diagram of the IC card in the fifth embodiment of the present invention.
Figure 1:
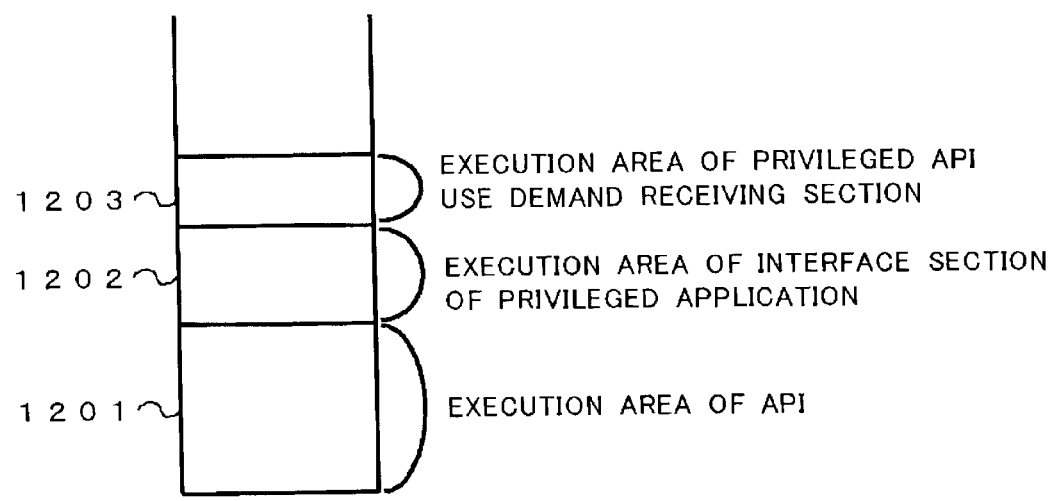
Figure 1:
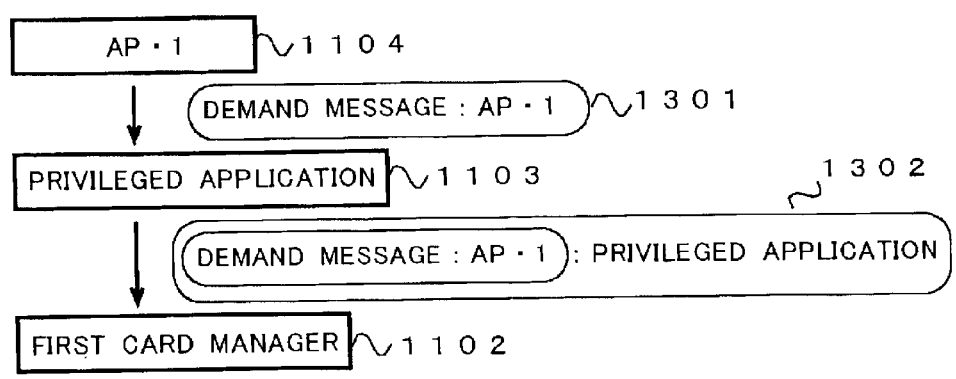

FIG. 11 is the function block diagram of the IC card for explaining the fifth embodiment of the present invention. FIG. 11 is substantially the same as FIG. 7 used for explaining the third embodiment, and an IC card 1100, a ROM 1101, a first card manager 1102, a privileged application 1103, a privileged API 1105, card privilege control means 1107, a general API 1106, a privileged AP control means 1108, a privileged API use demand receiving section 1109, and an interface section 1110 respectively correspond to the IC card 700, the ROM 701, the first card manager 702, the privileged application 703, the privileged API 706, the card privilege control means 707, the general API 708, the privileged AP control means 709, the privileged API use demand receiving section 710, and the interface section 711.

In FIG. 11, the privileged application 1103 provides a function as the second card manager for the AP.1 (1104), and the AP.1 (1104) accesses the interface section 1111 that the privileged application has when it uses the second card manager.

In this case, when the AP.1 (1104) accesses the interface section 1111 to demand the privilege manipulation and the interface section 1111 directly outputs the demand as the privileged API use demand to the privileged API use demand receiving section 1109, a problem occurs in which the AP.1 (1104), which is not the privileged application, can execute the privilege manipulation via the privileged application 1103.

In this embodiment, to solve the problem, the interface section 1110 of the first card manager 1102 prohibits the application from using the privileged API 1105 via the interface 1111 of the privileged application 1103.

Specifically, the interface section 1110 detects that an application other than the privileged application tries to access the privileged API 1105 via the interface section 1111 of the privileged application 1103, and it prohibits the application from accessing the privileged API 1105 when such an operation is detected.

(Fifth Embodiment: Determination by the Number of Interface Sections Passed)

As a method to realize the foregoing, there exists a method to check the number of interface sections the application passes through until it reaches the privileged API 1105. For example, access to the privileged API 1105 is prohibited when the application passes the interface section twice or more. An example is cited by using FIG. 11. When the application directly uses the interface section 1110 via the privileged API use demand receiving section 1109, it passes the interface section 1110 only once, so that its access to the privileged API 1105 will not be prohibited for the reason that it has used the interface section twice or more (but access may be prohibited for the reason that the application is not the privileged application).

On the contrary, if the application tries to use the privileged API 1105 after passing the interface section 1111 provided for the privileged application 1103 and then passing the interface section 1110, the access is permitted because the interface section 1110 is used from the privileged application 1103. However, in this case, the application has passed the two interface sections, that is, the interface section 1111 and the interface section 1110, and thus access to the privileged API 1105 is prohibited.

(Fifth Embodiment: Determination by the Content of a Stack)

Further, there also exists a method to check with the content of a stack of applications to control access to the privileged API 1105.

The 'stack' is a temporary operation region for operating the application, which is a 'LIFO' (last in first out) region which is used to record an address to which a function should return after the function finishes (a return address of function), or to hold a value of local variables used inside the function. The 'LIFO' means that when data is entered in the order of A and B, the data is taken out in the order of B and A, which is reversed from the way they were entered, for example.

FIG. 12 shows an example of the stack of the AP.1 (1104). The area added with reference numeral 1201 is an area that stores the return address and the local variable value of the function that is involved in an execution area of the AP.1 (1104). When the AP.1 (1104) accesses the interface section 1111 and a processing on the interface section 1111 is performed, the area added with reference numeral 1202 is stored in the stack. This area stores the return address and the local variable value of the function accompanied by the processing in the interface section 1111.

When the interface section 1111 accesses the privileged API use demand receiving section 1109 and the processing of the privileged API use demand receiving section 1109 is performed, the area added with reference numeral 1203 is stored. This area stores the return address and the local variable value of the function accompanied by the privileged API use demand receiving section 1109. The interface section 1110, by checking with the content of the stack, can determine whether or not the AP.1 (1104) tries to use the privileged API 1105 via the interface section 1111 of the privileged application 1103. To perform such determination on checking with the content of the stack, a technology may be used where a debugger checks with the content of the stack to perform back tracing.

(Fifth Embodiment: Use of Message Passing)

Furthermore, there also exists a mounting example in which when the AP.1 (1104) demands access to the interface section 1111 of the privileged application 1103 or when the privileged application 1103 outputs a privileged API use demand to the privileged API use demand receiving section 1109, the demand of access and the privileged API use demand are sent as a message (a mounting example by message passing). In such a case, information showing a route passed is added to the message, and the interface section 1110 can also determine from the added information by which route the demand has been sent.

FIG. 13 shows an example where the access demand is output to the interface section 1111 or the privileged API use demand is output to the privileged API use demand receiving section 1109 while the information showing the route passed is added to the message. The AP.1 (1104), in sending a demand message 1301 to the privileged application 1103, adds information showing that the AP.1 (1104) is a source of the message to the demand message 1301. When the privileged application 1103 sends the demand message 1301 as the privileged API use demand to the first card manager 1102, the demand is sent after a message 1302, added with information showing that it has passed the privileged application 1103, is generated in the demand message 1301. The interface section 1110 investigates the content of the message sent in this manner, and can detect whether or not the message from the application AP.1 (1104), which is not the privileged application, has been sent passing the privileged application 1103.

(Fifth Embodiment: Brief Description of Effects)

With this embodiment, it is possible to prevent the application that is not the privileged application from performing the privilege manipulation via the privileged application, which improves the security.

Sixth Embodiment

Next, description will be made for the IC card in which, in the case where the child application that the first card manager has downloaded is the privileged application having the second card manager capable of further downloading the grandchild application, the first card manager and/or the second card manager has counter means that counts the number of times that the applications including the grandchild application have been selected.

In this embodiment, modes can be cited where the first card manager has the counter means and the second card manager does not have the counter means, the first card manager does not have the counter means and only the second card manager has the counter means, and both the first and second card managers have the counter means. In the following, description will be made first for the mode where only the first card manager has the counter means.

(Sixth Embodiment: a Constitution of the Mode where only the First Card Manager has the Counter Means)

Figure 14:
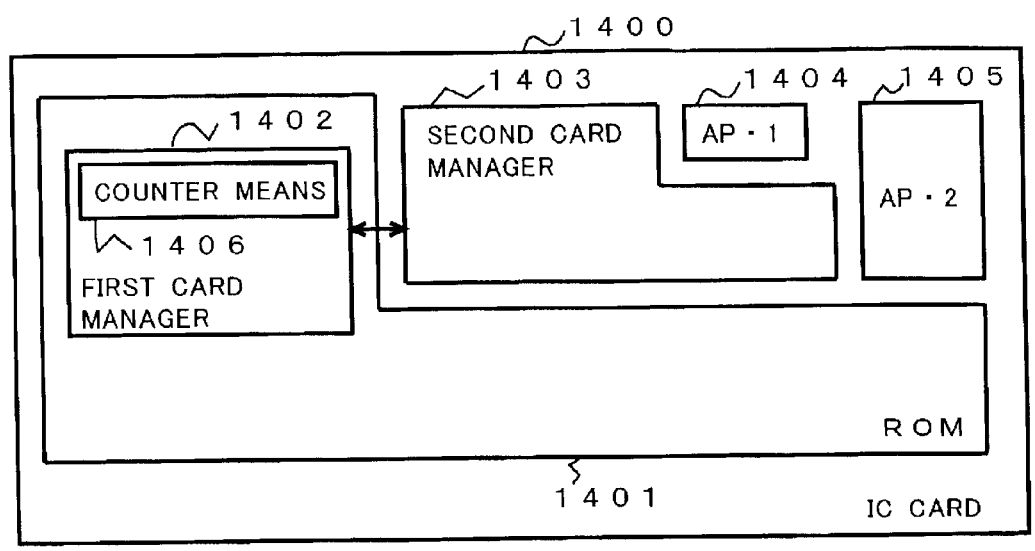
FIG. 14 is a function block diagram of the IC card in the sixth embodiment of the present invention.

FIG. 14 shows the function block diagram of the IC card according to the sixth embodiment of the present invention.

As the figure shows, a first card manager 1402 has counter means 1406 that records the number of times that the applications have been selected, in this embodiment.

The 'counter means' 1406 includes a counter inside thereof, and is capable of performing a manipulation to increase the value of the counter by 1 or reading out the value of the counter.

This embodiment enables the counter means to perform accounting for use of application, for example, based on the number of times that the applications have been selected.

In FIG. 14, an IC card 1400 has a ROM 1401, and the ROM 1401 includes a first card manager 1402. A child application 1403 downloaded by the first card manager 1402 is the privileged application having the second card manager capable of further downloading the grandchild application.

The AP.1 (1104) added with reference numeral 1404 is the application downloaded by the second card manager, which is the grandchild application for the first card manager 1402.

The 'first card manager' includes the counter means 1406. The counter means counts the number of times that the applications including the grandchild application have been selected.

The 'applications including the grandchild application' includes not only the child application that the first card manager directly controls, but also the application downloaded by the card manager that the privileged application has, which is the child application downloaded by the first card manager, (that is, the grandchild application), and furthermore, its offspring and the like.

In other words, they are, in the case where the grandchild application is the privileged application (referred to as a grandchild privileged application), all applications such as the application further downloaded by the grandchild privileged application (that is, great-grandchild privileged application) that the second card manager directly and indirectly controls.

'The number of times that the applications have been selected' is a number of times that the application has been activated, and the 'the number selected' may include the number of times that the application has made transition from a hibernation state to an active state.

(Sixth Embodiment: a Processing Flow when the First Card Manager is Informed of Application Activation from Another Card Manager)

Figure 16:
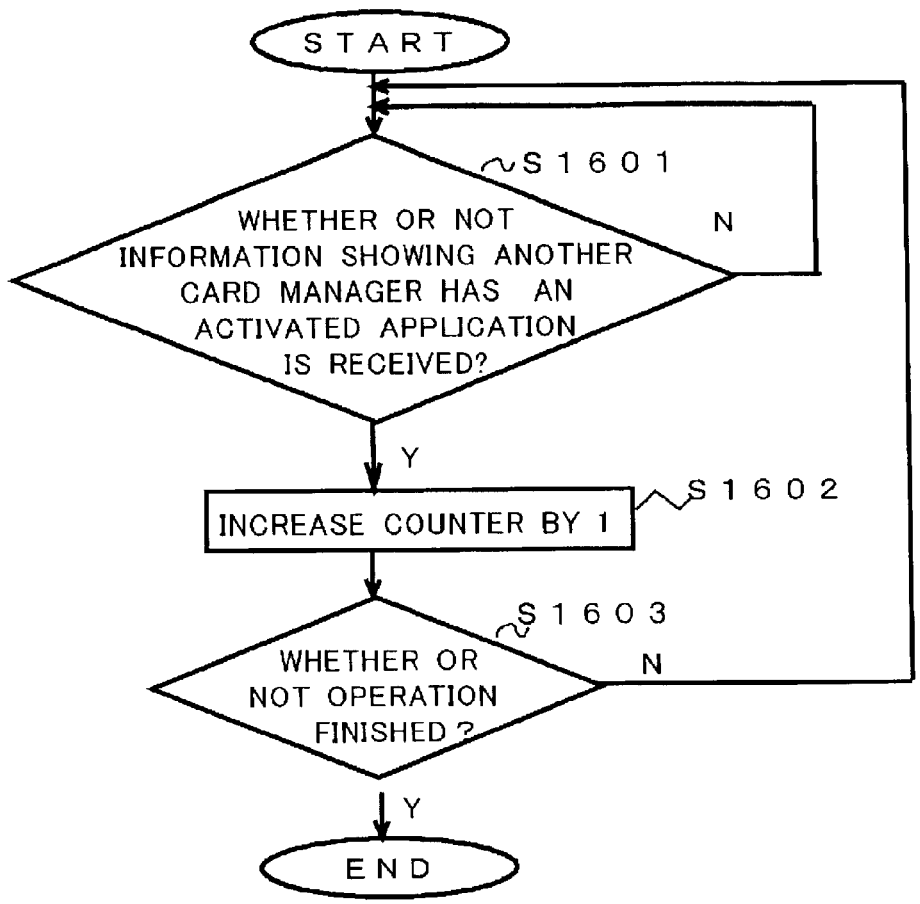
FIG. 16 is a flowchart explaining an operation of a first card manager.

FIG. 16 is the flowchart exemplifying the operation of the first card manager 1402, and 'the number of times that the applications have been selected' is the number of times that the application has been activated in this flowchart. In step 1601, the first card manager waits until it receives the information showing that another card manager has activated the application. When it receives the information showing that another card manager has activated the application, the processing moves to step S1602 to increase the counter of the counter means 1406 by 1. In step S1602, the first card manager determines whether it should finish counting or finish the operation of the first card manager 1402, and the processing returns to step S1601 if it has not finished.

Further, when the first card manager 1402 has activated the application, it increases the counter of the counter means 1406 by 1.

(Sixth Embodiment: a Processing Flow of Card Managers Other than the First Card Manager)

Figure 15:
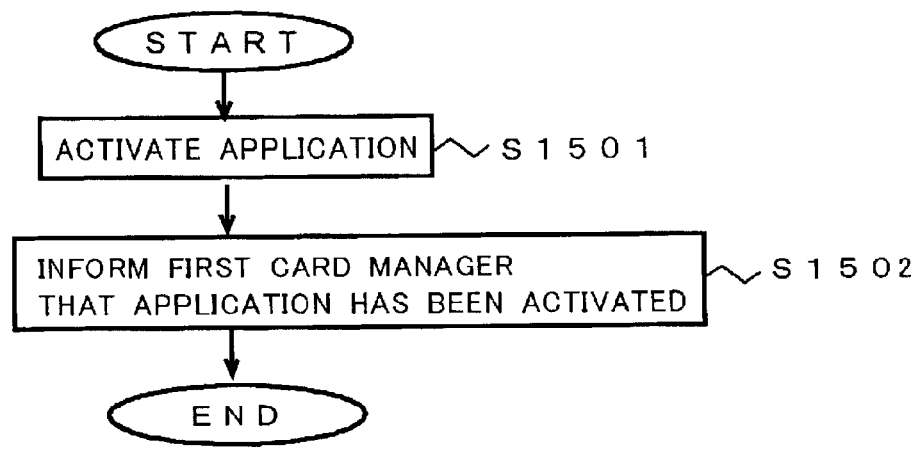
FIG. 15 is a flowchart explaining an operation of a second card manager.

FIG. 15 is the flowchart exemplifying the operation of the card manager (the second card manager, for example (hereinafter, referred to as 'another card manager')) other than the first card manager.

In step S1501, another card manager activates the application.

In step S1502, another card manager informs the first card manager 1402 that it has activated the application. Note that when the first card manager is capable of knowing application activation by another card manager without communication from another card manager, that is, when the privileged API informs the first card manger 1402 that the application has been activated for example, the second card manager does not need to perform a manipulation to communicate it to the first card manager.

By performing such an operation between the first card manager 1402 and the second card manager, the counter means 1406 of the first card manger 1402 counts the number of times that the application, which the first card manager 1402 itself directly controls, and the application including the grandchild application have been selected.

(Sixth Embodiment: a Mode where Only the Second Card Manager Has the Counter Means)

Furthermore, there also exists the mode as already described where the first card manager 1402 does not have the counter means 1406 but the second card manager 1403 has the counter means. In such a mode, the card manger other than the second card manger performs the processing of the flowchart in FIG. 15 (it is to be noted that 'the first card manager' is read as 'the second card manager' in step S1502). Further, the second card manager may perform the processing of the flowchart in FIG. 16. Still further, when the second card manager has activated the application, it increases the counter of the counter means by 1.

(Sixth Embodiment: the Mode where Both the First Card Manager and the Second Card Manager have the Counter Means)

Further, both the first card manager 1402 and the second card manager 1403 may have the counter means.

(Sixth Embodiment: an Application Subject to Counting by the Counter Means of the First Card Manager)

In the case where the first card manager 1402 has the counter means, a subject counted by the counter means may be the number that all applications in the IC card 1400 have been selected or the number that a part of the applications have been selected. For example, the counter may increase by 1 in the case where: the number, which the child application of the first card manager has been selected, is counted; the number, which the application having a particular identifier has been selected, is counted; the application selected by a particular card manager (the second card manager, for example) is counted; or offspring applications, which include the child application for a particular card manager (the second card manager, for example) and the grandchild application for the particular card manager, are selected.

(Sixth Embodiment: an Application Subject to Counting by the Counter Means of the Second Card Manager)

Similarly, in the case where the second card manager 1403 has the counter means, a subject counted by the counter means may be the number that all applications in the IC card 1400 have been selected or the number that a part of the applications have been selected.

(Sixth Embodiment: a Counting Subject when Both the First Card Manager and the Second Card Manager have the Counter Means)

In the case where both of the first card manager 1402 and the second card manager 1403 have the counter means, subjects counted by both counter means may be the same or different. When the subjects are different, the subjects to be counted may have or may not have a common area.

(Sixth Embodiment: an Example where the Counting Subjects do not have the Common Area)

As the example where the counting subjects do not have the common area, the first card manager 1402 counts the number of times that the application, which the first card manager 1402 itself directly controls (the child application corresponds to this, for example. Note that when the first card manager directly controls the grandchild application, the grandchild application corresponds to this.), has been selected. On the other hand, the counter means of the second card manager 1403 may count the number of times that the child application for the second card manager 1403 or the application that the second card manager 1403 directly controls, and the offspring applications including the grandchild application for the second card manager 1403 (hereinafter, referred to as a 'selection number of the offspring of the second card manager 1403'), has been selected.

(Sixth Embodiment: the First Card Manager is not Allowed to Count Due to the Privilege of the Second Card Manager)

Furthermore, the second card manager 1403 may also have a privilege that does not allow the counter means of the first card manager 1402 to count the selection number of the offspring of the second card manager 1403. In addition, the second card manager 1403 may be capable of selecting whether or not it allows the counter means of the first card manager 1402 to count the selection number of the offspring of the second card manager 1403.

(Sixth Embodiment: the Card Manager other than the First Card Manager and the Second Card Manager may have the Counter Means)

Further, in addition to the first card manager and the second card manager, a third card manager that the second card manager has downloaded may have the counter means.

(Sixth Embodiment: Brief Description of an Applied Example of Use at an Automated Ticket Gate and Its Effects)

With this embodiment, it becomes possible to control the number of times that the application has been selected, and accounting according to the number selected, can be performed. For example, counting of the activated number of the application, which is activated every time the user passes the ticket gate, is made possible, which enables the IC card to find a fee the user should pay when the fee is fixed. Furthermore, it also becomes possible to charge a maintenance fee or a support fee of the application according to the number of times that the application has been selected, and an appropriate maintenance fee and support fee can be set. Moreover, with a capability of downloading an application that counts the number of times that the application has been selected, downloading of an application that counts the number of times that a particular application has been selected, or that can transmit the number counted to a particular server is made possible, for example, and the counting subject or handling of a counting result can be changed after issuance of the IC card.

Seventh Embodiment

Next, description will be made for the IC card in which, in the case where the child application that the first card manager has downloaded is the privileged application having the second card manager capable of further downloading the grandchild application, the first card manager has processing log control means that controls processing logs of the application, which the first card manager itself directly controls, and the applications including the grandchild application, and the second card manager has processing log control means that controls the processing logs of the application, which the first card manager directly controls, and/or the applications including the grandchild application.

(Seventh Embodiment: Constitution)

Figure 17:
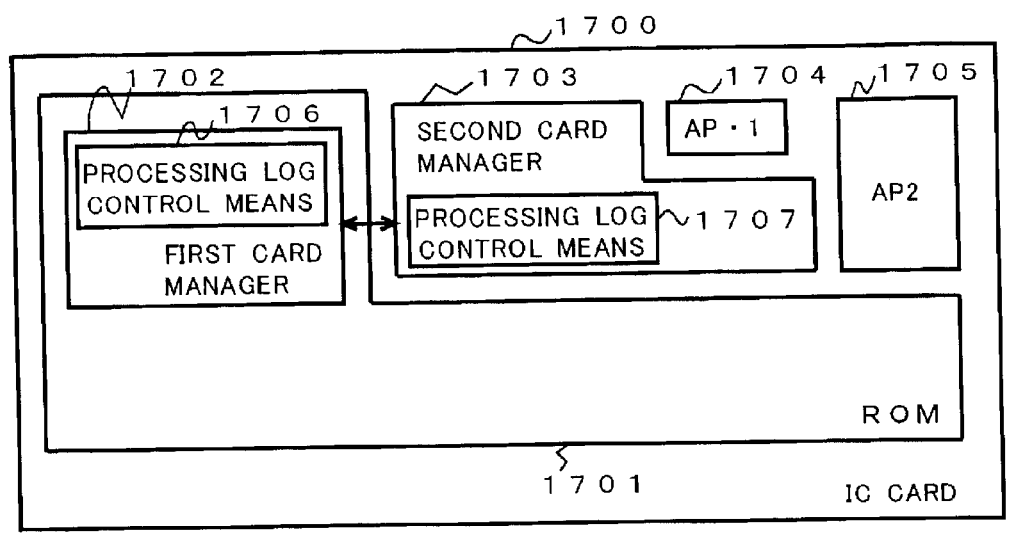
FIG. 17 is a function block diagram of the IC card in the seventh embodiment of the present invention.
Figure 18:
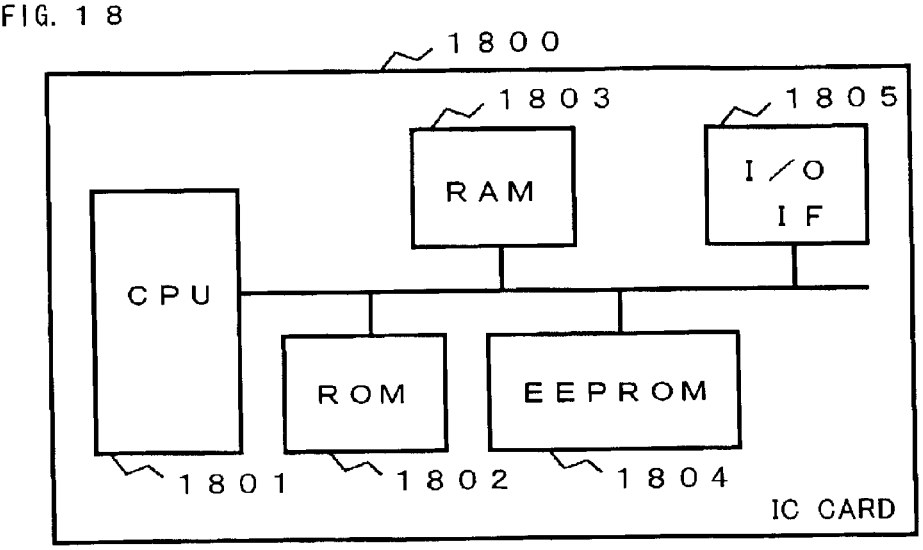
FIG. 18 is an exemplary view of a hardware constitution of the IC card.
Figure 19:
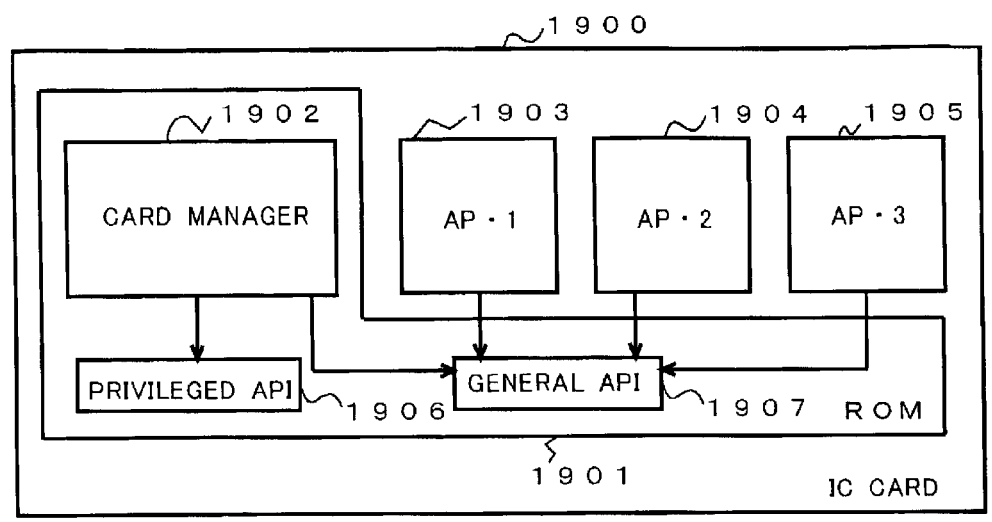
FIG. 19 is a view showing the relationship among applications in a conventional IC card.

FIG. 17 shows the function block diagram of the IC card according to the seventh Embodiment of the present invention. In this embodiment, the card manager has the processing log control means that records the log of the application.

The processing log control means can control the processing log of the application, and thus an accounting processing can be performed.

In FIG. 17, an IC card 1700 has a ROM 1701, and the ROM 1701 includes a first card manager 1702.

A child application downloaded by the first card manager 1702 is the privileged application having the second card manager capable of downloading the grandchild application.

In FIG. 14, the AP.1 added with reference numeral 1404 is the application downloaded by the second card manager, and is the grandchild application for the first card manager 1402.

The 'first card manager' includes processing log control means.

The 'processing log control means' controls the processing logs of the application that the card manager itself directly controls and the applications including the grandchild application.

The 'application that the card manger itself directly controls' is an application that is activated by the first card manager 1702 and is under control of the first card manager 1702. Such an application corresponds to the applications added with reference numeral 1703 and 1705 in FIG. 17.

The 'applications including the grandchild application' is all applications that the second card manager directly and indirectly controls such as an application (that is, the grandchild application) downloaded by the card manger that the privileged application, which the first card manager has downloaded, and an application further downloaded by the grandchild application when the grandchild application is the privileged application (referred to as a grandchild privileged application).

The 'processing log of the application' is a log that occurs as a result of the processing of the application. When a particular function of the application has been called, a record showing that the function was called is cited as an example. Alternatively, a record showing what kind of argument has been passed to the function is also cited as an example.

To 'control the processing log' is to update the processing log to the latest state and to store it in the IC card 1700 in a readable manner later.

The 'second card manager' (in this embodiment) has processing log control means 1707 that controls the processing logs of the application, which the first card manager directly controls' and/or the applications including the grandchild application.

(Seventh Embodiment: A Method where the Application Outputs the Processing Log)

As an example of a method that the application operating in the IC card outputs the processing log to the processing log control means 1706 and the processing log control means 1707, a method is cited where means for registering a card manger having the processing log control means is previously prepared in the IC card, or a function (or a method) to receive the processing log is previously prepared as the general API in the ROM 1701, and the function (or the method) outputs the processing log that has been received to the registered card manager.

Alternatively, the IC card is designed to be capable of registering a relationship between an application that has made the function (or the method) receive the processing log and the card manger, so that the processing log control means of a particular card manager can control the processing log of a particular application.

(Seventh Embodiment: Brief Description of an Applied Example of Use at an Automated Ticket Gate and Its Effects)

With this embodiment, it becomes possible to control the processing log of the application, and accounting according to the content of the processing log can be performed. For example, train stations where the user entered and exited through a ticket examiner can be recorded every time the user passes the ticket gate, which enables the IC card to find a fee the user should pay. Furthermore, it also becomes possible to charge the maintenance fee or the support fee of the application according to the content of the processing log of the application. And thus, the fair maintenance fee and support fee can be set when a high fee is tolled in the case of performing an advanced processing and a low fee is tolled in the case of performing a processing that is not advanced. Moreover, with a capability of downloading an application that controls the application processing log, controlling of the processing log of the particular application or downloading of an application that can transmit the processing log to the particular server is made possible, for example, and the subject of the processing log control or handling of the processing log can be changed after issuance of the IC card.

Effect of the Invention

As described above, according to the present invention, when the IC card has the card manager capable of downloading the application having the privilege even after issuance of the IC card, implementation of the application that obtains information, which cannot be obtained without the privilege, and operates is made possible.

Further, even if the card manager having another specification is proposed after issuance of the IC card, the IC card of the present invention can download the card manager having the specification as the application having the privilege, and thus an issuer of the IC card does not need to perform a task of issuing another IC card. As well, the user of the IC card does not need to have a plurality of IC cards.

Furthermore, when access is made to the privileged API, confirmation is made whether or not the application accessed is the application permitted to perform the privilege manipulation, and thus the privilege manipulation by the application having an unauthorized operation can be prevented. Thus, the security of confidential information or the like is ensured.

Still further, since counting of the application selection and controlling of the application processing log can be performed, a fair accounting processing or the like can be performed.

What is claimed is:

1. An IC card, comprising:
a first card manager downloading a privileged application that is an application having a privilege, wherein
in the case where a child application downloaded by the first card manager is the privileged application that further has a second card manager configured to further download a grandchild application, the first card manager is configured to change a life cycle of the grandchild application or deleting the grandchild application.

2. An IC card, comprising:
a first card manager downloading a privileged application that is an application having a privilege, wherein
in the case where a child application downloaded by the first card manager is the privileged application that has a second card manager configured to further download a grandchild application, the second card manager is configured to prohibit the first card manager from changing the life cycle of the grandchild application and deleting the grandchild application.

3. An IC card, comprising:
a first card manager downloading a privileged application that is an application having a privilege, wherein
in the case where a child application downloaded by the first card manager is the privileged application that has a second card manager configured to further download a grandchild application, the second card manager is configured to change the life cycle of the child application that the first card manager has downloaded and deleting the child application.

4. An IC card, comprising:
a first card manager downloading a privileged application that is an application having a privilege, wherein
in the case where a child application downloaded by the first card manager is the privileged application that has a second card manager configured to further download a grandchild application, said IC card comprising:
selection means configured to select a dominance between a privilege that the first card manager has and a privilege that the second card manager has.

5. An IC card, comprising:
a first card manager downloading a privileged application that is an application having a privilege, wherein
in the case where a child application downloaded by the first card manager is the privileged application that has a second card manager configured to further download a grandchild application,
the first card manager and/or a second card manager has counter means that counts a number of times that the applications including the grandchild application have been selected.

6. An IC card, comprising:
a first card manager downloading a privileged application that is an application having a privilege, wherein
in the case where a child application download by the first card manager is the privileged application that has a second card manager configured to further download a grandchild application,
the first card manager has processing log control means that controls processing logs of the application, which the first card manager itself directly controls, and the applications including the grandchild application, and
a second card manager has processing log control means that controls the processing logs of the application, which the first card manager directly controls, and/or the applications including the grandchild application.

* * * * *